United States Patent
Ho

(10) Patent No.: US 10,587,196 B1
(45) Date of Patent: Mar. 10, 2020

(54) CONSTANT ON-TIME CONTROLLER AND BUCK REGULATOR DEVICE USING THE SAME

(71) Applicant: ELITE SEMICONDUCTOR MEMORY TECHNOLOGY INC., Hsinchu (TW)

(72) Inventor: I-Hsiu Ho, Zhubei (TW)

(73) Assignee: ELITE SEMICONDUCTOR MEMORY TECHNOLOGY INC. (TW)

( * ) Notice: Subject to any disclaimer, the term of this patent is extended or adjusted under 35 U.S.C. 154(b) by 0 days.

(21) Appl. No.: 16/282,352

(22) Filed: Feb. 22, 2019

(51) Int. Cl.
| | |
|---|---|
| H02M 3/158 | (2006.01) |
| H02M 1/08 | (2006.01) |
| H02M 3/157 | (2006.01) |
| H02M 1/00 | (2006.01) |

(52) U.S. Cl.
CPC ............ H02M 3/158 (2013.01); H02M 1/08 (2013.01); H02M 3/157 (2013.01); H02M 2001/0009 (2013.01)

(58) Field of Classification Search
CPC ........ H02M 1/08; H02M 3/158; H02M 3/157; H02M 2001/0009
USPC ........ 323/222, 224, 259, 271–275, 282–290, 323/351
See application file for complete search history.

(56) References Cited

U.S. PATENT DOCUMENTS

| | | | | |
|---|---|---|---|---|
| 5,481,178 A | * | 1/1996 | Wilcox ................. | H02M 3/156 323/224 |
| 7,482,793 B2 | * | 1/2009 | Stoichita ............. | H02M 3/1563 323/271 |
| 8,698,467 B2 | * | 4/2014 | Oki ........................ | H02M 3/156 323/282 |
| 8,729,881 B2 | | 5/2014 | Chang | |
| 9,431,845 B2 | | 8/2016 | Xu et al. | |
| 9,467,051 B2 | * | 10/2016 | Stoichita ............... | H02M 3/158 |
| 2008/0252274 A1 | * | 10/2008 | Schindler ............ | H02M 3/1588 323/282 |
| 2011/0062932 A1 | * | 3/2011 | Hawkes ................ | H02M 3/156 323/288 |
| 2013/0099761 A1 | * | 4/2013 | Dong .................... | H02M 3/156 323/271 |
| 2014/0159689 A1 | * | 6/2014 | Chen ..................... | H02M 3/156 323/282 |

* cited by examiner

*Primary Examiner* — Rajnikant B Patel
(74) *Attorney, Agent, or Firm* — Schmeiser, Olsen & Watts, LLP

(57) ABSTRACT

A constant on-time controller has a voltage divider, a current ripple extractor, a one-shot on-timer, a comparator and a flip flop. The voltage divider generates a feedback voltage according to a regulator output voltage. The current ripple extractor senses a current in an energy storage inductor of a buck regulator flowing through flowing through an output capacitor's ESR, and generates an extracted ripple current having no DC component accordingly. The one-shot on-timer outputs a constant-on time control signal according to a buck regulator input voltage and the regulator output voltage. The modulation circuit outputs a modulation signal according to a reference voltage signal, the feedback voltage and the extracted ripple current. The flip flop generates a control signal to the buck regulator according to the modulation signal and the constant-on time control signal. An off-time of the buck regulator is determined according to the modulation signal.

14 Claims, 5 Drawing Sheets

CONSTANT ON-TIME CONTROLLER AND BUCK REGULATOR DEVICE USING THE SAME

FIELD OF THE INVENTION

The present disclosure relates to a buck regulator, and in particular to a constant on-time controller used in a buck regulator device.

BACKGROUND OF THE INVENTION

A constant on-time controller can be used in a buck regulator device, the constant on-time controller can use a regulator output voltage ripple to initiate an on-time whenever a regulator output voltage falls below a reference voltage. An on-time is terminated (generating an on-time pulse) by circuitry in response to other conditions (such as a level of a regulator input voltage). During the on-time pulse, energy is supplied directly from the regulator input voltage to the regulator output voltage via an electronic switching device. Likewise, when the on-time pulse has terminated, stored energy in the energy storage inductor is supplied to the regulator output voltage.

The buck regulator device with the constant on-time controller usually include circuits that adjust the on-time pulse duration as a function of the regulator input voltage and regulator output voltage, thus resulting in an almost constant frequency as the duty cycle changes. The regulator output voltage ripple is determined to a large extent by a ripple current in the energy storage inductor flowing through an output capacitor's equivalent series resistance (ESR). In applications that the multilayer ceramic capacitor (MLCC) has the small ESR, such that the voltage ripple from the energy storage inductor is also small. This creates two problems for the constant on-time controller, stability and susceptibility to noise.

SUMMARY OF THE INVENTION

One objective of the present disclosure is to provide a constant on-time controller used in a buck regulator device, so as to extend a noise margin of the constant on-time controller.

Another one objective of the present disclosure is to provide a constant on-time controller used in a buck regulator device to minimize the susceptibility of the constant on-time controller to the noise, such that a jitter is substantially reduced.

Another one objective of the present disclosure is to provide a buck regulator device comprising a buck regulator and a constant on-time controller electrically connected to the buck regulator, so as to solve the problems of stability and susceptibility to the noise.

To achieve at least the above objective, the present disclosure provides a constant on-time controller comprising a voltage divider, a current ripple extractor, a one-shot on-timer, a comparator and a flip flop. The voltage divider generates a feedback voltage according to a regulator output voltage of a buck regulator. The current ripple extractor senses a current in an energy storage inductor of the buck regulator flowing through an output capacitor's ESR, and generates an extracted ripple current having no DC component according to a sensed current. The one-shot on-timer outputs a constant-on time control signal according to a regulator input voltage of the buck regulator and the regulator output voltage. The modulation circuit electrically connected to the voltage divider and the current ripple extractor outputs a modulation signal according to a reference voltage signal, the feedback voltage and the extracted ripple current. The flip flop electrically connected to the one-shot on-timer and the modulation circuit generates a control signal to the buck regulator according to the modulation signal and the constant-on time control signal. An on-time of the buck regulator is determined according to the constant-on time control signal and an off-time of the buck regulator is determined according to the modulation signal.

To achieve at least the above objective, the present disclosure provides a buck regulator device comprising the buck regulator and the constant on-time controller electrically connected to the buck regulator.

In one embodiment of the present disclosure, the flip flop is a RS flip flop, a set end of the RS flip flop is electrically connected to comparator and the one-shot on-timer to receive the comparison result signal and an inversion of the constant-on time control signal, and a reset end of the RS flip is electrically connected to the one-shot on-timer to receive the constant-on time control signal.

In one embodiment of the present disclosure, the one-shot on-timer comprises a capacitor, a current source and a voltage comparator. The current source electrically connected to a ground via the capacitor generates a current proportional to the regulator input voltage, so as to form a first voltage across the capacitor. The voltage comparator electrically connected to a connection end of the capacitor and the current source compares the regulator output voltage and the first voltage to output the constant-on time control signal.

In one embodiment of the present disclosure, the constant on-time controller further comprises a ramp generator. The ramp generator electrically connected to the modulation circuit generates a ramp voltage signal. The modulation circuit outputs the modulation signal according to the feedback voltage, the reference voltage signal, the ramp voltage signal and the extracted ripple current.

In one embodiment of the present disclosure, the current ripple extractor comprises a current sensing amplifier, a sample/hold circuit and a subtractor. The current sensing amplifier senses the current in the energy storage inductor of the buck regulator flowing through the output capacitor's ESR to obtain the sensed current. The sample/hold circuit electrically connected to the current sensing amplifier samples and holds up the DC component of the sensed current. The subtractor electrically connected to the current sensing amplifier and the sample/hold circuit subtracts a hold-up DC component from the sensed current to generate the extracted ripple current.

In one embodiment of the present disclosure, the modulation circuit comprises an amplifier, a capacitor, an adder and a modulator. The amplifier receives the reference voltage signal and the feedback voltage to generate a regulated reference voltage signal. Two ends of the capacitor are respectively electrically connected to the amplifier and a ground. The adder electrically connected to the amplifier subtracts a first voltage signal associated with the extracted ripple current from the regulated reference voltage signal to generate a second voltage signal. The modulator electrically connected to the adder generates the modulation signal according to the second voltage signal and the feedback voltage.

In one embodiment of the present disclosure, the modulation circuit comprises an adder and a modulator. The adder electrically connected to the amplifier subtracts a first voltage signal associated with the extracted ripple current from the reference voltage signal to generate a second voltage signal. The modulator electrically connected to the adder generates the modulation signal according to the second voltage signal and the feedback voltage.

In one embodiment of the present disclosure, the voltage divider comprises resistors electrically connected in series.

To sum up, present disclosure provides a constant on-time controller used in the buck regulator device with an enhanced noise margin. Moreover, the jitter can be also improved in some embodiments, and thus the provided constant on-time controller can further have the improved stability and the noise resistance.

DETAILED DESCRIPTION OF THE PREFERRED EMBODIMENTS

To make it easier for the examiner to understand the objects, characteristics and effects of this present disclosure, embodiments together with the attached drawings for the detailed description of the present disclosure are provided.

An embodiment of the present disclosure provides a buck regulator device comprising a constant on-time controller and a buck regulator electrically connected to the buck regulator, wherein a current ripple extractor of the constant on-time controller is used to sense a current flowing in the energy storage inductor flowing through an output capacitor's ESR (i.e. to sense a low side current of the buck regulator), to remove a direct current (DC) component of a sensed current to generate an extracted ripple current, and to generate a ripple voltage signal to a comparator of the constant on-time controller according to the extracted ripple current, so as to extend a noise margin of the constant on-time controller.

Furthermore, in another one embodiment of the present disclosure, a ramp generator is used in the constant on-time controller to provide a ramp voltage signal to the comparator of the constant on-time controller, and thus the susceptibility of the constant on-time controller to the noise is minimized, and a jitter is substantially reduced. In short, the provided constant on-time controller of the buck regulator device can solve the problems of stability and susceptibility to the noise.

Figure 1:
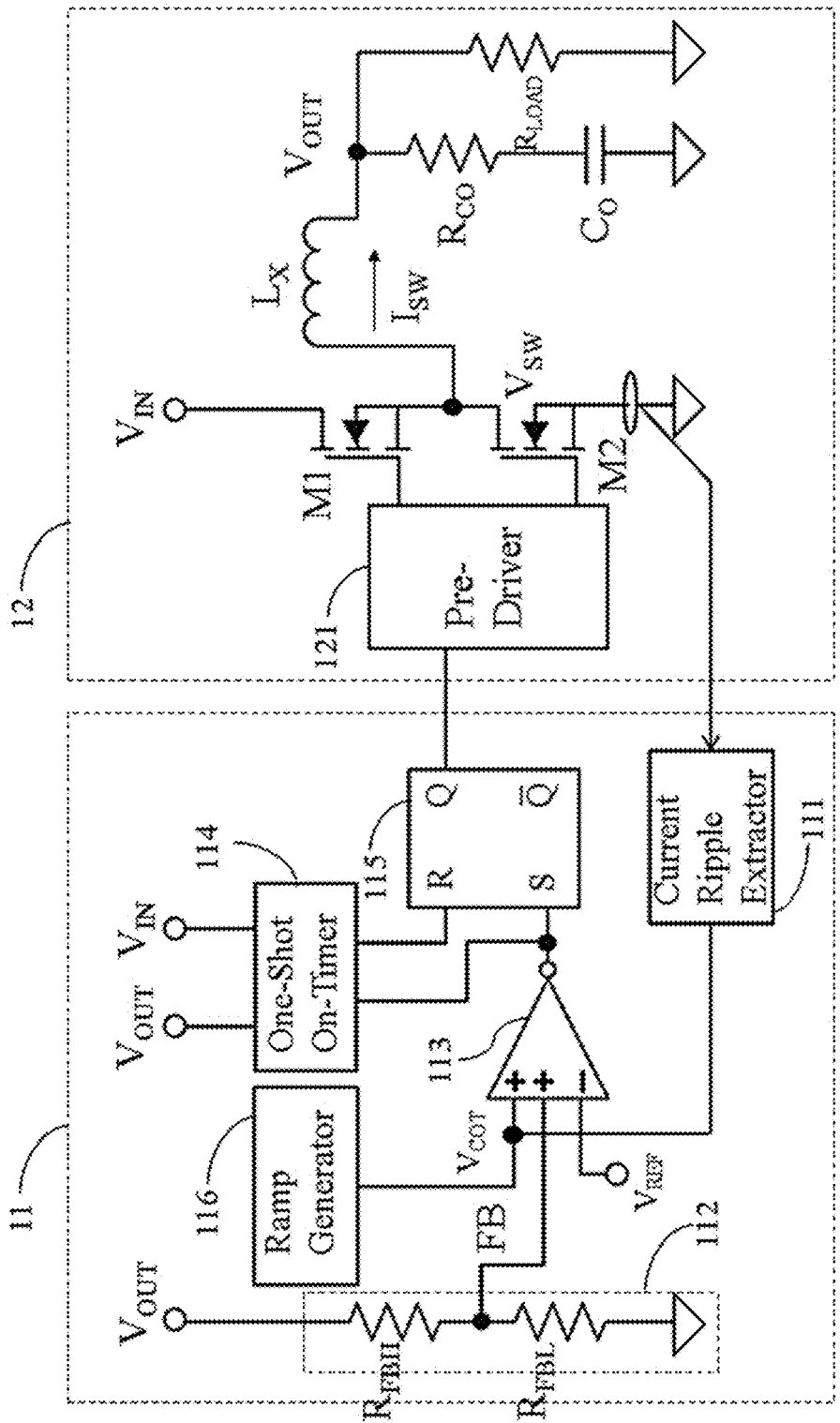
FIG. 1 is a circuit diagram of a buck regulator device according to one embodiment of the present disclosure.

Referring to FIG. 1, FIG. 1 is a circuit diagram of a buck regulator device according to one embodiment of the present disclosure. A buck regulator device 1 comprises a constant on-time controller 11 and a buck regulator 12 electrically connected to the constant on-time controller 11. The buck regulator 12 is controlled by the constant on-time controller 11 to be turned on or off. When the buck regulator 12 is turned on, the buck regulator 11 transfers energy of a regulator input voltage $V_{IN}$ to a regulator input voltage $V_{OUT}$ via an electronic switching device (formed by transistors M1 and M2). When the buck regulator 12 is turned off, the stored energy in an energy storage inductor $L_X$ is supplied to the regulator output voltage $V_{OUT}$.

The constant-on time controller 11 receives the regulator output voltage $V_{OUT}$, and senses a current $I_{SW}$ in the energy storage inductor $L_X$ flowing through an output capacitor's ESR (i.e. the resistance of the resistor $R_{CO}$ of the output capacitor $C_O$). The current $I_{SW}$ is also the low side current of the buck regulator 12. The constant-on time controller 11 generates a feedback voltage FB according to the regulator output voltage $V_{OUT}$, and generate an extracted ripple current according to a sensed current. The constant on-time controller 11 can determine an off-time (i.e. duration which the buck regulator 12 is turned off) of the buck regulator 12 according to the feedback voltage FB and the extracted ripple current, and determine the an on-time (i.e. duration which the buck regulator 12 is turned on) of the buck regulator 12 according to the regulator input voltage VIN and the regulator output voltage $V_{OUT}$. Since the extracted ripple current does not have the DC component of the current $I_{SW}$, the DC component of the current $I_{SW}$ is not amplified in the constant on-time controller 11, such that the noise margin of constant on-time controller 11 can be extended, and the constant on-time controller 11 can precisely control off-time of the buck regulator 12.

Moreover, to consider the jitter due to the noise, the constant on-time controller 11 further generates a ramp voltage signal, and determine the off-time of the buck regulator 12 not only according to the feedback voltage FB and extracted ripple current, but also according to the ramp voltage signal. Since the ramp voltage signal is considered, the susceptibility to the noise of the constant on-time controller 11 is reduced, and the jitter due to the noise can be reduced.

Details of the buck regulator 12 are illustrated as follows. The buck regulator 12 comprises a pre-driver 121 (or a logic circuit), the transistors M1, M2, the energy storage inductor $L_X$, the output capacitor $C_O$ and the output resistor $R_{CO}$. An output load $R_{LOAD}$ can be electrically connected to the regulator output voltage $V_{OUT}$. The output capacitor $C_O$ is electrically connected to the output resistor $R_{CO}$ in a serial connection manner, wherein the output resistor $R_{CO}$ is electrically connected to a ground via the output capacitor $C_O$.

The regulator output voltage $V_{OUT}$ is electrically connected the output resistor $R_{CO}$ and the energy storage inductor $L_X$. The transistors M1 and M2 (for example, PMOS transistors) form the electronic switching device. Gates of the transistors M1 and M2 are electrically connected to the pre-driver 121, a source of the transistor M1 is electrically to the regulator input voltage $V_{IN}$, a drain of the transistor M1 is electrically connected to the energy storage inductor $L_X$ and a source of the transistor M2, and a drain of the transistor M2 is electrically connected to the ground. The drains of the transistors M1 and M2 are also electrically connected to the constant on-time controller 11, such that the constant on-time controller 11 can sense the current $I_{SW}$.

The pre-driver 121 is used to receive a control signal from the constant on-time controller 11. The pre-driver 121 outputs gate control signals to gates of the transistors M1 and M2 according to the control signal. When the transistor M1 is turned on (at the same time, the transistor M2 is turned off), the buck regulator 12 is turned on, such that the energy of the regulator input voltage VIN is transferred to the regulator output voltage $V_{OUT}$ (i.e. the current $I_{SW}$ is increased); and when the transistor M2 is turned on (at the same time, the transistor M1 is turned off), the buck regulator 11 is turned off, such that that the stored energy in the energy storage inductor $L_X$ is supplied to the regulator output voltage $V_{OUT}$ (i.e. the current $I_{SW}$ is decreased).

Still refereeing to FIG. 1, details of the constant on-time controller 11 are illustrated as follows. The constant on-time controller 11 comprises a current ripple extractor 111, a voltage divider 112, a modulation circuit 113, a one-shot on-timer 114, a RS flip flop 115 and a ramp generator 116. The current ripple extractor 111 is electrically connected to the drain of the transistor M2, and further electrically connected to the modulation circuit 113. The voltage divider 112 is electrically connected to the regulator output voltage $V_{OUT}$ and the modulation circuit 113. The ramp generator 116 is electrically connected to the modulation circuit 113. The modulation circuit 113 is electrically connected to a reference voltage signal $V_{REF}$ and the RS flip flop 115. The RS flip flop 115 is electrically connected to the pre-driver 121 and the one-shot on-timer 114.

The current ripple extractor 111 senses the current $I_{SW}$ in the energy storage inductor $L_X$ flowing through an output capacitor's ESR (i.e. the low side current of the buck regulator 12) to generate the sensed current, and removes the DC component of the sensed current to generate the extracted ripple current. Then, the current ripple extractor 111 generate a ripple voltage signal according to the extracted ripple current to the modulation circuit 113.

The ramp generator 116 is used to generate a ramp voltage signal to the modulation circuit 113, and the ramp voltage signal and the ripple voltage signal are combined to form a voltage signal $V_{COT}$. As mentioned above, the ramp voltage signal is used to reduce the jitter due the noise, and the ramp generator 116 can be removed (i.e. the voltage signal $V_{COT}$ is the ripple voltage signal) if the jitter is not effective.

The voltage divider 112 comprises resistors $R_{FBH}$ and $R_{FBL}$, wherein the resistor $R_{FBH}$ is electrically connected to the regulator output voltage $V_{OUT}$, the modulation circuit 113 and the resistor $R_{FBL}$, and the resistor $R_{FBL}$ is electrically connected to the ground. The voltage divider 112 generate the feedback voltage FB across the resistor $R_{FBL}$ according to the regulator output voltage $V_{OUT}$, and the feedback voltage FB is received by the modulation circuit 113.

The modulation circuit 113 generates a modulation signal according to the addition result of the voltage signal $V_{COT}$ and the feedback voltage FB and a reference voltage signal $V_{REF}$, and outputs the modulation signal to the set end of the RS flip flop 115. For example, the RS flip flop 115 outputs the control signal with a logic high level to pre-driver 121 when the addition result of the voltage signal $V_{COT}$ and the feedback voltage FB is less than the reference voltage signal $V_{REF}$ (or the reference regulated voltage signal generated from the reference voltage signal $V_{REF}$), and the gate control signals generated by the pre-driver 121 turn on the transistor M1 and turn on the transistor M2. That is, the off-time of the buck regulator can be terminated when the addition result of the voltage signal $V_{COT}$ and the feedback voltage FB is less than the reference voltage signal $V_{REF}$ (or the reference regulated voltage signal generated from the reference voltage signal $V_{REF}$).

Figure 2A:
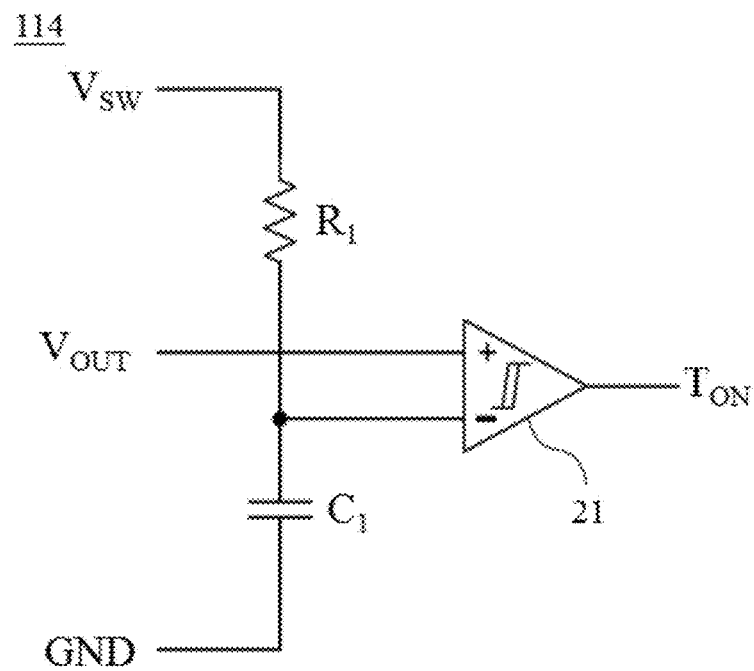
FIG. 2A is a circuit diagram of a one-shot on-timer according to one embodiment of the present disclosure.
Figure 2B:
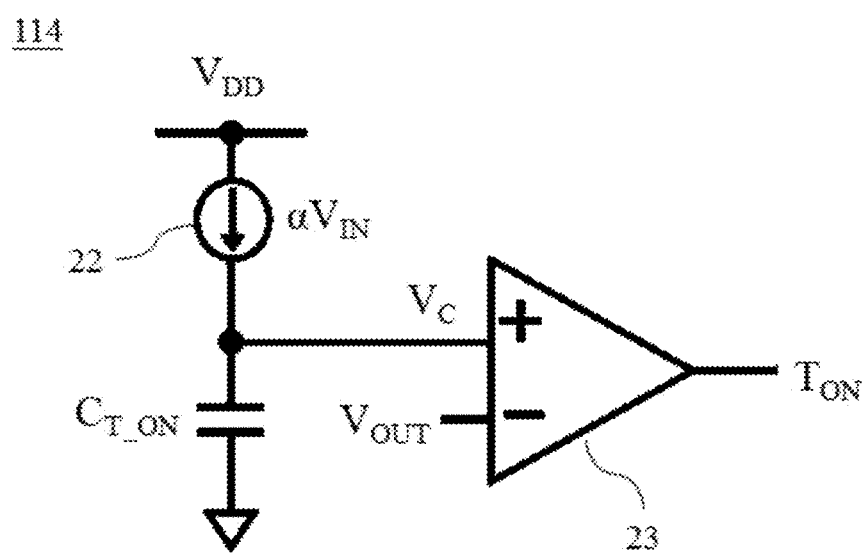
FIG. 2B is a circuit diagram of a one-shot on-timer according to another one embodiment of the present disclosure.

The one-shot on-timer 114 receives the regulator input voltage VIN and the regulator output voltage $V_{OUT}$, and generates an on-time control signal $T_{ON}$ (as shown in FIG. 2A and FIG. 2B) and an inversion of the on-time control signal $T_{ON}$ according to the regulator input voltage VIN and the regulator output voltage $V_{OUT}$. The on-time control signal $T_{ON}$ and the inversion of the on-time control signal $T_{ON}$ are respectively input to a reset end and a set end of the RS flip flop 115.

The RS flip flop 115 outputs the control signal with a logic high level to pre-driver 121 when the on-time control signal $T_{ON}$ is logic low, and the gate control signals generated by the pre-driver 121 turn on the transistor M2 and turn off the transistor M1. That is, the on-time of the buck regulator is terminated when the addition result of on-time control signal $T_{ON}$ is logic low. Accordingly, the constant on-time controller 11 can controls the on-time and off-time of the buck regulator 12.

It is noted that, the implementation of the constant on-time controller 11 in FIG. 1 is not used to the limit the present disclosure. Other implementations for achieving the function of the constant on-time controller 11 can be obtained by the person with the ordinary skill in the art after she or he refers the present disclosure. For example, in other one implementation, the RS flip flop 15 can be replaced by the flip flop of other one kind.

Referring to FIG. 1 and FIG. 2A, FIG. 2A is a circuit diagram of a one-shot on-timer according to one embodiment of the present disclosure. It is noted that FIG. 2A shows one embodiment of the one-shot on-timer 114 of FIG. 1, and the present disclosure is not limited thereto. The one-shot on-timer 114 comprises a hysteresis comparator 21, a resistor $R_1$ and a capacitor $C_1$. The resistor $R_1$ is electrically connected to a voltage $V_{SW}$ at the drain of the transistor M1 and the source of the transistor M2 (i.e. the voltage at one end of the energy storage inductor $L_X$), and further electrically connected to the ground via the capacitor $C_1$. A positive and negative input ends of the hysteresis comparator 21 are respectively electrically connected to the regulator output voltage $V_{OUT}$ and the connection point of the capacitor $C_1$ and the resistor $R_1$.

The hysteresis comparator 21 compares the voltage across the capacitor $C_1$ and the regulator output voltage $V_{OUT}$ to output a hysteresis comparison result signal as the on-time control signal $T_ON$. The voltage $V_{SW}$ varies according to the regulator input voltage VIN, the voltage across the capacitor $C_1$ is generated according to the voltage $V_{SW}$, and the on-time control signal $T_ON$ is determined according to the voltage $V_{SW}$ and the regulator output voltage $V_{OUT}$. That is, the on-time of the buck regulator 12 is determined according to the regulator input voltage VIN and the regulator output voltage $V_{OUT}$.

Referring to FIG. 1 and FIG. 2B, FIG. 2B is a circuit diagram of a one-shot on-timer according to another one embodiment of the present disclosure. It is noted that FIG. 2B shows another one embodiment of the one-shot on-timer 114 of FIG. 1, and the present disclosure is not limited thereto. The one-shot on-timer 114 comprises a current source 22, a voltage comparator 23 and a capacitor $C_{T\_ON}$. The current source 22 is electrically connected to a supply voltage VDD and the ground via the capacitor $C_{T\_ON}$. Positive and negative input ends of the voltage comparator 23 are respectively electrically connected to the connection point of the current source 22 and the capacitor $C_{T\_ON}$ and the regulator output voltage $V_{OUT}$.

The current source 22 generates a current flowing through the capacitor $C_{T\_ON}$ according to the regulator input voltage $V_{IN}$, wherein the current is proportional to the regulator input voltage $V_{IN}$. The current flowing through the capacitor $C_{T\_ON}$ to form a voltage $V_C$ across the capacitor $C_{T\_ON}$, and the voltage comparator 23 compares the voltage $V_C$ and the regulator output voltage $V_{OUT}$ to generate the comparison result signal as the as the on-time control signal $T_{ON}$. Accordingly, the on-time of the buck regulator 12 is determined according to the regulator input voltage $V_{IN}$ and the regulator output voltage $V_{OUT}$.

Figure 3:
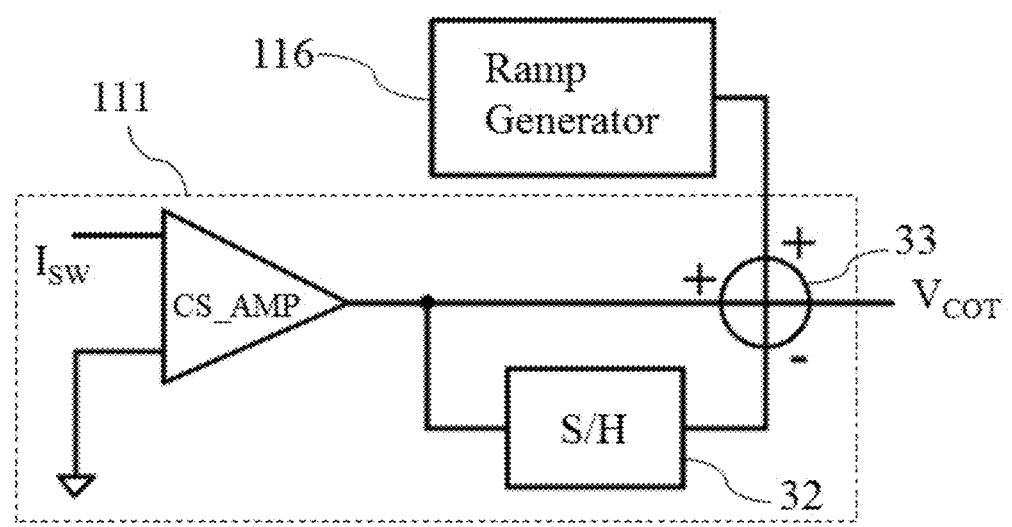
FIG. 3 is a circuit diagram of a current ripple extractor according to one embodiment of the present disclosure.

Next, referring to FIG. 1 and FIG. 3, FIG. 3 is a circuit diagram of a current ripple extractor according to one embodiment of the present disclosure. It is noted that FIG. 3 shows one embodiment of the current ripple extractor 111 of FIG. 1, and the present disclosure is not limited thereto. The current ripple extractor 111 comprises a current sensing amplifier 31, a sample/hold circuit 32 and a subtractor 33. One input end of the current sensing amplifier 31 is electrically connected to the drain of the transistor M1 and the energy storage inductor $L_X$ to receive the low side current of the buck regulator 12 (i.e. the current $I_{SW}$), and other one input end of the current sensing amplifier 31 is electrically connected to the ground. An output end of the current sensing amplifier 31 is electrically connected to the subtractor 33 and the sample/hold circuit 32. The subtractor 33 is electrically connected to the sample/hold circuit 32 and the comparator 113.

The current sensing amplifier 31 is used to sense the current $I_{SW}$. The sensed current is generated by the current sensing amplifier 31 and sent to the subtractor 33 and the sample/hold circuit 32. The DC component of the sensed current can be sampled and hold up by the sample/hold circuit 32. The subtractor 33 can subtract the hold-up DC component (i.e. the DC component of the previous sensed current) from the sensed current to generate the extracted ripple current, and the extracted ripple current is output as the ripple voltage signal. The subtractor 33 can further add the ramp voltage signal from the ramp generator 116 and the ripple voltage signal to form the voltage signal $V_{COT}$ on the input end of the modulation circuit 113.

Figure 4A:
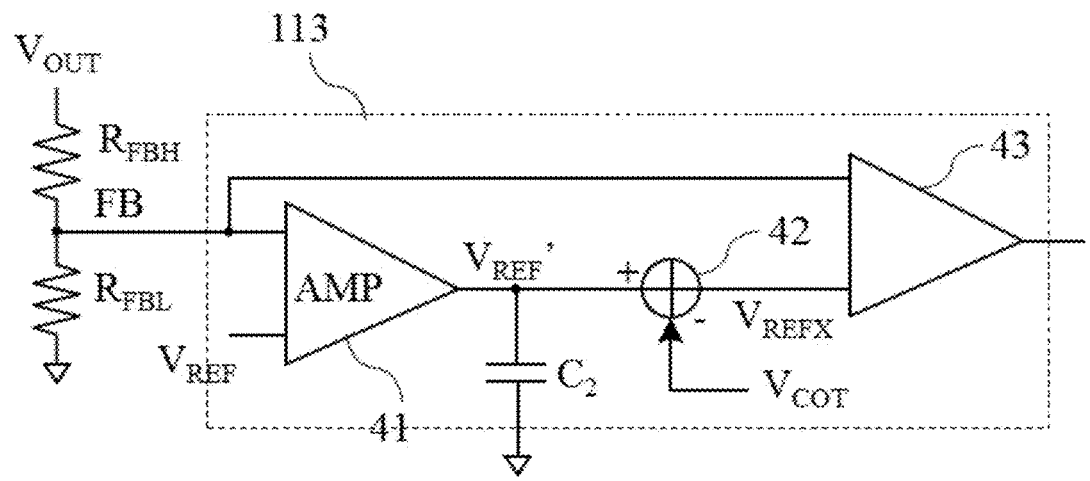
FIG. 4A is a circuit diagram of a modulation circuit according to one embodiment of the present disclosure.

Next, referring to FIG. 1 and FIG. 4A, FIG. 4A is a circuit diagram of a modulation circuit according to one embodiment of the present disclosure. It is noted that FIG. 4 shows one embodiment of the modulation circuit 113 of FIG. 1, and the present disclosure is not limited thereto. The modulation circuit 113 comprises an amplifier 41, a capacitor C2, an adder 42 and a modulator 43. An output end of the amplifier 41 is electrically connected to one end of the capacitor C2. Two input ends of the amplifier 41 are respectively electrically connected to the feedback voltage FB and the reference voltage signal $V_{REF}$. Another one end of the capacitor C2 is electrically connected to the ground. Two input ends of the modulator 43 are respectively electrically connected to the feedback voltage FB and an output end of the adder 42, and an output end of the modulator 43 is electrically connected to the RS flip flop 115. Two input ends of the adder 42 are respectively electrically connected to the voltage signal $V_{COT}$ and the output end of the amplifier 41.

According to the feedback voltage FB and the reference voltage signal $V_{REF}$, the amplifier 41 generates a regulated reference voltage signal $V_{REF}'$. The adder 42 subtracts the voltage signal $V_{COT}$ from the regulated reference voltage signal $V_{REF}'$ to generate a voltage signal $V_{REFX}$. Next, the modulator 43 generates the modulation signal according to the voltage signal $V_{REFX}$ and the feedback voltage FB.

Figure 4B:
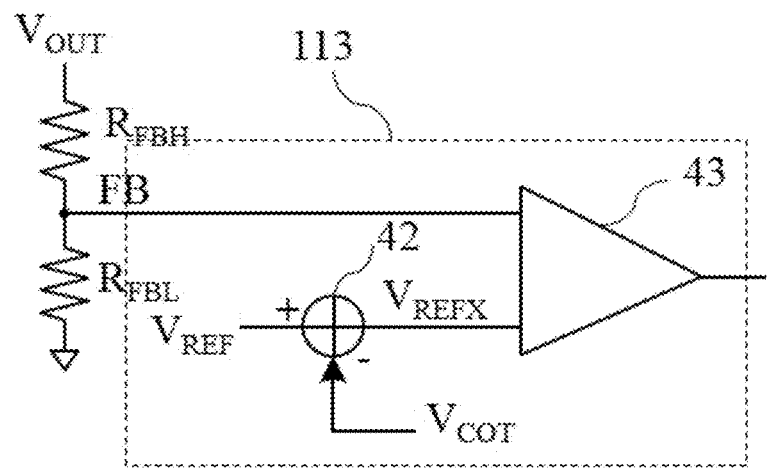
FIG. 4B is a circuit diagram of a modulation circuit according to another one embodiment of the present disclosure.

It is noted that the amplifier 41 is used to regulate the reference voltage signal $V_{REF}$, thus the accuracy is not affected by the compensation of the noise margin. However, the present disclosure is not limited thereto. Referring to FIG. 4B, FIG. 4B is a circuit diagram of a modulation circuit according to another one embodiment of the present disclosure. In this embodiment, the amplifier 41 and the capacitor C2 of FIG. 4A are removed. Thus, the adder 42 in FIG. 4B subtracts the voltage signal VCOT from the reference voltage signal $V_{REF}$ to generate the voltage signal $V_{REFX}$, and the modulator 43 generates the modulation signal according to the voltage signal $V_{REFX}$ and the feedback voltage FB.

Figure 5:
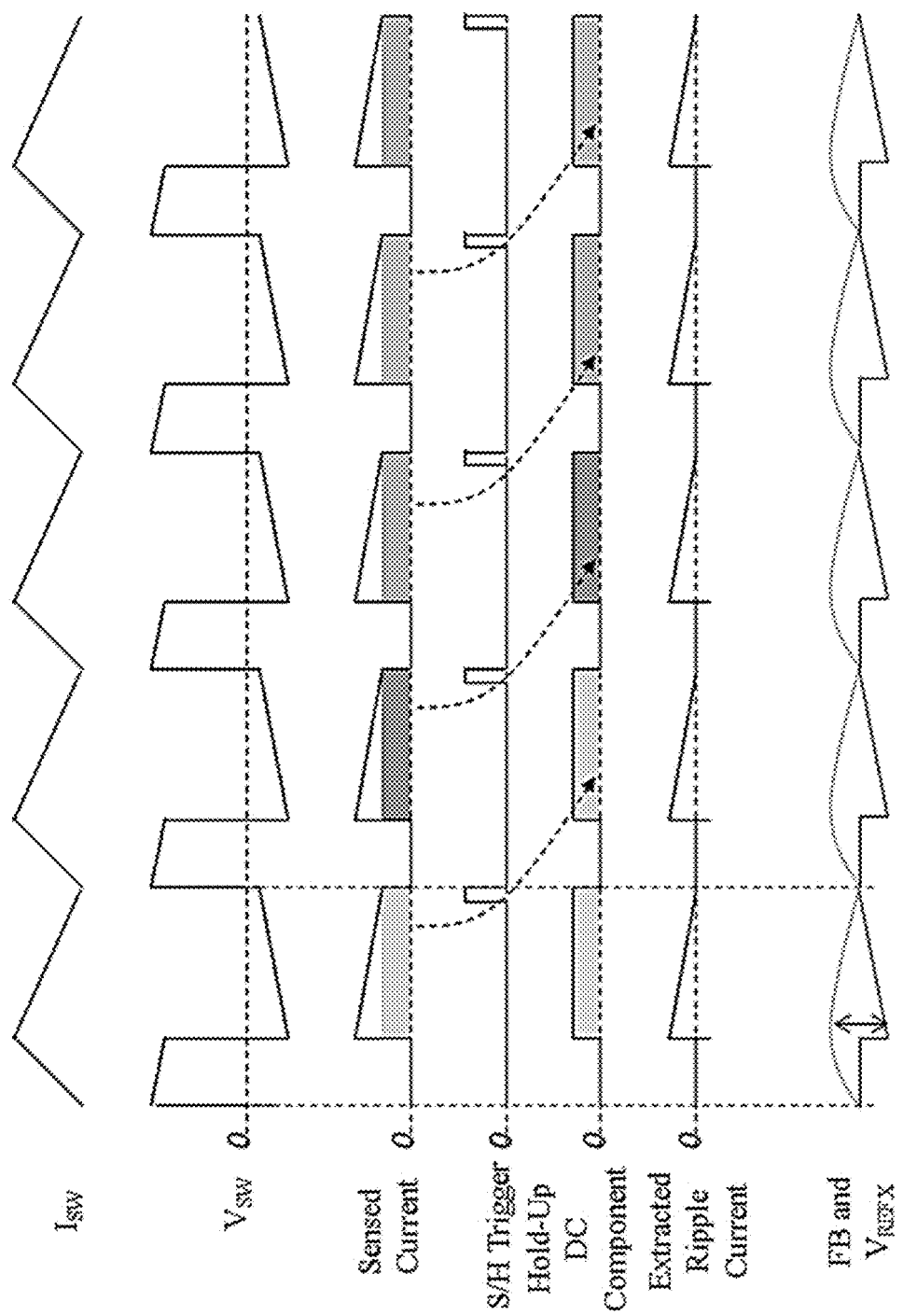
FIG. 5 is a waveform diagram of signals of a buck regulator device according to one embodiment of the present disclosure.

Next, referring to FIG. 1, FIG. 4A and FIG. 5, FIG. 5 is a waveform diagram of signals of a buck regulator device according to one embodiment of the present disclosure. The current $I_{SW}$ is increased when the buck regulator 12 is turned on, and is decreased when the buck regulator 12 is turned off. The voltage $V_{SW}$ is positive and decreased when the buck regulator 12 is turned on, and is negative and increased when the buck regulator 12 is turned on.

The sensed current has the DC component, and thus the DC component of the sensed current can be sampled and hold up according to the sample/hold trigger. The ripple current extractor 111 can subtract the hold-up DC component of the sensed current from the currently sensed current, so as to generate the extracted ripple current. The extracted ripple current and reference voltage signal $V_{REF}$ can be used to generate the comparison voltage signal Vrefx as mentioned above. The feedback voltage FB and the comparison voltage signal $V_{REFX}$ can be used to determined the off-time of the buck regulator 12. Specifically, when the feedback voltage FB is less than the comparison voltage signal $V_{REFX}$, the off-time of the buck regulator 12 is terminated.

In conclusion, the present disclosure provides a constant on-time controller used in the buck regulator device, and the provided constant on-time controller can obtain the extracted ripple current by sensing the current in the energy storage inductor flowing through the output capacitor's ESR, wherein the extracted ripple current and the feedback voltage can be used to determine the off-time of the buck regulator. Since the extracted ripple current has no DC component, the provided constant controller can have an enhanced noise margin. Moreover, the jitter can be also improved by using a ramp voltage signal to compensate the slope of the extracted ripple current, and thus the provided constant on-time controller has the improved stability and the noise resistance.

While the present disclosure has been described by means of specific embodiments, numerous modifications and variations could be made thereto by those skilled in the art without departing from the scope and spirit of the present disclosure set forth in the claims.

What is claimed is:

1. A constant on-time controller, comprising:
    a voltage divider, generating a feedback voltage according to a regulator output voltage of a buck regulator;
    a current ripple extractor, sensing a current in an energy storage inductor of the buck regulator flowing through an output capacitor's ESR, and generating an extracted ripple current having no DC component according to a sensed current;
    a one-shot on-timer, outputting a constant-on time control signal according to a regulator input voltage of the buck regulator and the regulator output voltage;
    a modulation circuit, electrically connected to the voltage divider and the current ripple extractor, outputting a modulation signal according to a reference voltage signal, the feedback voltage and the extracted ripple current, wherein the modulation circuit comprises
        an amplifier, receiving the reference voltage signal and the feedback voltage to generate a regulated reference voltage signal;

a capacitor, two ends thereof respectively electrically connected to the amplifier and a ground;

an adder, subtracting a first voltage signal associated with the extracted ripple current from the regulated reference voltage signal to generate a second voltage signal; and a modulator, electrically connected to the adder, generating the modulation signal according to the second voltage signal and the feedback voltage; and a flip flop, electrically connected to the one-shot on-timer and the modulation circuit, generating a control signal to the buck regulator according to the modulation signal and the constant-on time control signal;

wherein an on-time of the buck regulator is determined according to the constant-on time control signal and an off-time of the buck regulator is determined according to the modulation signal.

2. The constant on-time controller according to claim 1, wherein the flip flop is a RS flip flop, a set end of the RS flip flop is electrically connected to comparator and the one-shot on-timer to receive the comparison result signal and an inversion of the constant-on time control signal, and a reset end of the RS flip is electrically connected to the one-shot on-timer to receive the constant-on time control signal.

3. The constant on-time controller according to claim 1, wherein the one-shot on-timer comprises:

a capacitor;

a resistor, electrically connected to a ground via the capacitor, receiving a first voltage at one end of the energy storage inductor, wherein the first voltage varies according to the regulator input voltage; and a hysteresis comparator, electrically connected to a connection end of the capacitor and the resistor, comparing a second voltage at the connection end of the capacitor and the resistor with the regulator output voltage to generate a hysteresis comparison result signal as the constant-on time control signal.

4. The constant on-time controller according to claim 1, wherein the one-shot on-timer comprises:

a capacitor;

a current source, electrically connected to a ground via the capacitor, generating a current proportional to the regulator input voltage, so as to form a first voltage across the capacitor; and a voltage comparator, electrically connected to a connection end of the capacitor and the current source, comparing the regulator output voltage and the first voltage to output the constant-on time control signal.

5. The constant on-time controller according to claim 1, further comprising:

a ramp generator, electrically connected to the modulation circuit, generating a ramp voltage signal;

wherein the modulation circuit outputs the modulation signal according to the feedback voltage, the reference voltage signal, the ramp voltage signal and the extracted ripple current.

6. The constant on-time controller according to claim 1, wherein the current ripple extractor comprises:

a current sensing amplifier, sensing the current in the energy storage inductor of the buck regulator flowing through the output capacitor's ESR to obtain the sensed current;

a sample/hold circuit, electrically connected to the current sensing amplifier, sampling and holding up the DC component of the sensed current; and a subtractor, electrically connected to the current sensing amplifier and the sample/hold circuit, subtracting a hold-up DC component from the sensed current to generate the extracted ripple current.

7. The constant on-time controller according to claim 1, wherein the voltage divider comprises resistors electrically connected in series.

8. A buck regulator device, comprising:

a constant on-time controller, comprising:

a voltage divider, generating a feedback voltage according to a regulator output voltage of a buck regulator;

a current ripple extractor, sensing a current in an energy storage inductor of the buck regulator flowing through an output capacitor's ESR, and generating an extracted ripple current having no DC component according to a sensed current;

a one-shot on-timer, outputting a constant-on time control signal according to a regulator input voltage of the buck regulator and the regulator output voltage;

a modulation circuit, electrically connected to the voltage divider and the current ripple extractor, outputting a modulation signal according to a reference voltage signal, the feedback voltage and the extracted ripple current, wherein the modulation circuit comprises an amplifier, receiving the reference voltage signal and the feedback voltage to generate a regulated reference voltage signal;

a capacitor, two ends thereof respectively electrically connected to the amplifier and a ground;

an adder, subtracting a first voltage signal associated with the extracted ripple current from the regulated reference voltage signal to generate a second voltage signal; and a modulator, electrically connected to the adder, generating the modulation signal according to the second voltage signal and the feedback voltage; and a flip flop, electrically connected to the one-shot on-timer and the modulation circuit, generating a control signal to the buck regulator according to the modulation signal and the constant-on time control signal;

wherein an on-time of the buck regulator is determined according to the constant-on time control signal and an off-time of the buck regulator is determined according to the modulation signal; and the buck regulator, electrically connected to the constant on-time controller.

9. The buck regulator device according to claim 8, wherein the flip flop is a RS flip flop, a set end of the RS flip flop is electrically connected to comparator and the one-shot on-timer to receive the comparison result signal and an inversion of the constant-on time control signal, and a reset end of the RS flip is electrically connected to the one-shot on-timer to receive the constant-on time control signal.

10. The buck regulator device according to claim 8, wherein the one-shot on-timer comprises:

a capacitor;

a resistor, electrically connected to a ground via the capacitor, receiving a first voltage at one end of the energy storage inductor, wherein the first voltage varies according to the regulator input voltage; and a hysteresis comparator, electrically connected to a connection end of the capacitor and the resistor, comparing a second voltage at the connection end of the capacitor and the resistor with the regulator output voltage to generate a hysteresis comparison result signal as the constant-on time control signal.

11. The buck regulator device according to claim 10, wherein the one-shot on-timer comprises:

a capacitor;

a current source, electrically connected to a ground via the capacitor, generating a current proportional to the regulator input voltage, so as to form a first voltage across the capacitor; and a voltage comparator, electrically connected to a connection end of the capacitor and the current source, comparing the regulator output voltage and the first voltage to output the constant-on time control signal.

12. The buck regulator device according to claim 8, wherein the constant on-time generator further comprises:

a ramp generator, electrically connected to the modulation circuit, generating a ramp voltage signal;

wherein the modulation circuit outputs the modulation signal according to the feedback voltage, the reference voltage signal, the ramp voltage signal and the extracted ripple current.

13. The buck regulator device according to claim 9, wherein the current ripple extractor comprises:

a current sensing amplifier, sensing the current in the energy storage inductor of the buck regulator flowing through the output capacitor's ESR to obtain the sensed current;

a sample/hold circuit, electrically connected to the current sensing amplifier, sampling and holding up the DC component of the sensed current; and a subtractor, electrically connected to the current sensing amplifier and the sample/hold circuit, subtracting a hold-up DC component from the sensed current to generate the extracted ripple current.

14. The buck regulator device according to claim 8, wherein the voltage divider comprises resistors electrically connected in series.

* * * * *